US008773474B2

(12) United States Patent
Takakura et al.

(10) Patent No.: US 8,773,474 B2
(45) Date of Patent: Jul. 8, 2014

(54) PROGRAM, IMAGE DATA PROCESSING METHOD, AND IMAGE DATA PROCESSING APPARATUS

(75) Inventors: Hiroki Takakura, Tokyo (JP); Satoshi Hoshiba, Tokyo (JP)

(73) Assignee: Sony Corporation, Tokyo (JP)

( * ) Notice: Subject to any disclaimer, the term of this patent is extended or adjusted under 35 U.S.C. 154(b) by 1193 days.

(21) Appl. No.: 12/343,739

(22) Filed: Dec. 24, 2008

(65) Prior Publication Data

US 2009/0184982 A1  Jul. 23, 2009

(30) Foreign Application Priority Data

Jan. 17, 2008  (JP) .................................. 2008-007563

(51) Int. Cl.
*G09G 5/00* (2006.01)
(52) U.S. Cl.
USPC ......... 345/681; 382/305; 382/190; 348/207.1
(58) Field of Classification Search
None
See application file for complete search history.

(56) References Cited

U.S. PATENT DOCUMENTS

| 5,786,814 A * | 7/1998 | Moran et al. .................. 715/720 |
| 2004/0004663 A1 * | 1/2004 | Kahn et al. ................. 348/207.1 |
| 2007/0110338 A1 * | 5/2007 | Snavely et al. ............... 382/305 |

FOREIGN PATENT DOCUMENTS

| JP | 2000-32374 | 1/2000 |
| JP | 2004-356718 | 12/2004 |
| JP | 2006-186541 | 7/2006 |

OTHER PUBLICATIONS

Exploiting Location and Time for Photo Search and Storytelling in MyLifeBits, Aris et al., 2004.*
Using GPS-Photo Link with TerraSync and any Digital Camera, 2007.*
Geographic Location Tags on Digital Images, Toyama et al., 2003, pp. 1-11.*
Office Action issued Mar. 29, 2011, in Japan Patent Application No. 2008-007563.

* cited by examiner

*Primary Examiner* — David Zarka
*Assistant Examiner* — Phong Nguyen
(74) *Attorney, Agent, or Firm* — Oblon, Spivak, McClelland, Maier & Neustadt, L.L.P.

(57) ABSTRACT

A program causes a computer or similar apparatus to execute processing to match image data with log data on the basis of date and time information, wherein the image data contains appended date and time information indicating the time of image acquisition, and the log data contains date and time information associated with position information. As a result, position information is associated with image data. Display processing is subsequently executed to display, on a map image, acquisition location presentation images that indicate the acquisition locations of the image data according to the respective position information associated thereto. In accordance with correction input in the form of a time value, correction processing is then executed to correct associated position information for all image data specified for processing and additionally update the map image to reflect such corrections. The association results are then applied and saved in accordance with save command input.

12 Claims, 12 Drawing Sheets

PROGRAM, IMAGE DATA PROCESSING METHOD, AND IMAGE DATA PROCESSING APPARATUS

CROSS REFERENCES TO RELATED APPLICATIONS

The present invention contains subject matter related to Japanese Patent Application JP 2008-007563 filed in the Japanese Patent Office on Jan. 17, 2008, the entire contents of which are incorporated herein by reference.

BACKGROUND OF THE INVENTION

1. Field of the Invention

The present invention relates to a program, an image data processing method, and an image data processing apparatus. More particularly, the present invention relates to technology for taking acquired image data and appending thereto position information that indicates the location where the image data was acquired.

2. Description of the Related Art

In the related art, there exists software that takes image data acquired by a digital still camera, for example, and applies thereto position information that indicates the place where the image data was acquired. Processing executed by such software will now be described with reference to FIG. 12.

The digital still camera 90 represents an ordinary still image acquisition device that is used by a typical user, wherein image acquisition is conducted according to user operations. Date and time information (i.e., values for the year, month, day, hour, minute, and second of image acquisition) obtained by an internal clock is then appended to respective sets of image data (i.e., single images) that have been acquired and saved.

The GPS log apparatus 80 is a compact device carried by the user, and is provided with functions to receive and store information with respect to a global positioning system (GPS). Herein, the GPS log apparatus 80 successively saves position information (i.e., latitude and longitude values) as well as date and time information. As a result of being carried by the user, the GPS log apparatus 80 creates a route trace of the user's movement that is stored as GPS log data.

Subsequently, the user transfers and saves image data acquired by means of the digital still camera 90 to a personal computer 1. GPS log data accumulated in the GPS log apparatus 80 is also transferred to the personal computer 1.

Installed on the personal computer 1 is an application program 100 for conducting matching processing (hereinafter referred to as a matching program), which functions as software for taking the image data that was acquired by the digital still camera 90 and appending thereto position information that indicates the location of image acquisition. Matching of the image data and the GPS log is thus conducted as a result of the personal computer 1 executing computational processing on the basis of the matching program 100.

Consider, for example, four sets of image data transferred from the digital still camera 90 to the personal computer 1 that were respectively acquired on Jan. 15, 2008 at 10:35, 10:45, 10:55, and 11:05, and have the respective filenames "DSC0001.JPG", "DSC0002.JPG", "DSC0003.JPG", and "DSC004.JPG". Information indicating the above date and times of image acquisition is respectively appended to the above image data files in the digital still camera 90 at the time of image acquisition.

In addition, consider the case wherein the user carries and causes the GPS log apparatus 80 to operate between 10:30 and 11:30 on Jan. 15, 2008, for example. In so doing, there comes to exist position information (i.e., latitude and longitude values) corresponding to respective time values between 10:30 and 11:30, such information being stored as GPS log data that is subsequently transferred from the GPS log apparatus 80 to the personal computer 1.

The matching program 100 then matches the date and time information appended to each set of image data with the data and time information in the GPS log data, and thereby determines which position information corresponds to which image data. In other words, the matching program 100 associates position information (i.e., latitude and longitude values) to each set of image data "DSC0001.JPG", "DSC0002.JPG", "DSC0003.JPG", and "DSC0004.JPG" shown in FIG. 12, the association being conducted using the date and time information as a basis therefor. After associating position information in this way, the associated position information is appended within the corresponding image data files and then recorded on a recording medium.

By appending position information to image data files in this way, it becomes possible to subsequently execute processing to show the acquisition location of each set of image data on a map display, for example.

SUMMARY OF THE INVENTION

Accurate time values are recorded in the date and time information in the GPS log data, typically being Greenwich time values transmitted from a satellite. When using a personal computer system in Japan, for example, the matching program is configured to conduct matching by first taking the date and time information expressed as Greenwich Mean Time values in the GPS log data and converting the time values to Japan time. In so doing, accurate date and time information is obtained from the log data as Japan time values.

However, the date and time information in an image acquisition apparatus as represented by digital still cameras and digital video cameras is often given as local time values according to internal clock functions. Moreover, since time is measured on the basis of time settings configured by the user, it is likely that the time is inaccurate by several seconds to several minutes.

If such inaccuracy exists with respect to the correct time in the date and time information that is appended to the image data in the digital still camera 90, then the association of position information with respect to respective image data is not accurately realized when executing matching processing like that shown in FIG. 12. For example, consider the case wherein the time measurement in the digital still camera 90 is two minutes slower than the correct time. As a result, the position information that is associated with a set of image data indicates the user's location two minutes prior to the time when the user was in the location where that image data was acquired.

In the above case, accurate positions are not displayed when subsequently displaying image acquisition locations on a map display, for example. When the positions indicating image acquisition locations on a map display are inaccurate, it is conceivable to allow the user to perform operations to move plot points on the map display to the correct positions. However, when image acquisition locations for a large amount of image data are being displayed, individually adjusting a large number of plot points becomes highly time-consuming and laborious work. Moreover, such corrections rely on the user's memory, and in practice, it is difficult for the user to not only correctly remember the respective locations where the large amount of image data was acquired, but also to correctly find the image acquisition locations on a map. For these reasons, such corrections are often problematic from a practical perspective.

Furthermore, when images are acquired during a trip overseas, time inaccuracies may occur due to factors such as time zone differences or local daylight saving time. For example, when using the digital still camera 90 overseas, the user may adjust the internal clock of the digital still camera 90 to the local time. Consequently, the image acquisition date and time information appended to acquired image data is expressed in local time. Meanwhile, the GPS log apparatus 80 possessed by the user may continue to accumulate date and time information expressed in Greenwich Mean Time.

In this case, when the user returns home to Japan and imports the image data and the GPS log data to a personal computer in the user's home, the date and time information in the GPS log data is converted to Japan time by the matching program 100. However, the image acquisition date and time information that is appended to the image data remains in the local time of the acquisition location. For this reason, position information is not correctly associated with respective image data on the basis of the date and time information.

In this way, the association of position information with respect to image data may not be correctly executed by a matching program, due to factors such as inaccurate time values in the internal clock of the digital still camera 90 or similar imaging apparatus, as well as time zone differences.

Consequently, when matching is conducted in order to associate position information with respect to image data, the present invention enables correction of the association between position information and a large amount of image data by means of a simple user operation.

A program in accordance with an embodiment of the present invention causes a computational processing apparatus to execute: matching processing, being executed with respect to image data having appended thereto date and time information indicating the time of image acquisition, wherein all image data specified for processing is matched on the basis of date and time information using log data containing date and time information that is associated with position information, and wherein the position information is then associated with the image data; display processing that displays, on a map image, acquisition location presentation images that indicate the acquisition locations of the image data, the display processing being conducted on the basis of the position information that is associated with the image data specified for processing; correction processing that corrects, according to correction input in the form of a time value, the position information associated with all image data specified for processing, while additionally causing the acquisition location presentation images to be displayed on a map image updated with corrected position information; and association results save processing that applies and saves the association of position information with respect to all image data specified for processing, the save processing being conducted according to save command input.

In addition, the correction of position information in the above correction processing may involve first correcting the image acquisition date and time information that is appended to all image data specified for processing, the correction being conducted according to correction input in the form of a time value. Subsequently, matching is conducted on the basis of date and time information using the log data, and then position information is newly associated to the image data. In so doing, processing is executed to correct the position information that is associated with all image data specified for processing.

In addition, the correction input in the form of a time value may be input for adjusting the date and time information appended to the image data that indicates the time of image acquisition.

In addition, the correction input in the form of a time value may be input for issuing instructions to correct the time zone.

In addition, thumbnail images of the image data may be used as the acquisition location presentation images.

In addition, in the above display processing, a route trace image based on the log data may also be displayed on the map image.

In addition, the program may additionally cause the computational processing apparatus to execute processing in accordance with operation input that specifies and moves a particular acquisition location presentation image on the map image, wherein the processing corrects the position information associated with the image data that corresponds to the particular acquisition location presentation image.

An image data processing method in accordance with another embodiment of the present invention includes the steps of: executing matching processing with respect to image data having appended thereto date and time information indicating the time of image acquisition, wherein all image data specified for processing is matched on the basis of date and time information using log data containing date and time information that is associated with position information, and wherein the position information is then associated with the image data; executing display processing that displays, on a map image, acquisition location presentation images that indicate the acquisition locations of the image data, the display processing being conducted on the basis of the position information that is associated with the image data specified for processing; executing correction processing that corrects, according to correction input in the form of a time value, the position information associated with all image data specified for processing, while additionally causing the acquisition location presentation images to be displayed on a map image updated with corrected position information; and executing association results save processing that applies and saves the association of position information with respect to all image data specified for processing, the save processing being conducted according to save command input.

An image data processing apparatus in accordance with another embodiment of the present invention is provided with: a storage unit configured to store both image data having appended thereto date and time information indicating the time of image acquisition, as well as log data containing date and time information that is associated with position information; and a computational processor. The computational processor reads image data specified for processing as well as the log data from the storage unit, and subsequently executes: matching processing that conducts matching on the basis of date and time information and associates position information with respect to the image data specified for processing; display processing that displays, on a map image, acquisition location presentation images that indicate the acquisition locations of the image data, the display processing being conducted on the basis of the position information that is associated with the image data specified for processing; correction processing that corrects, according to correction input in the form of a time value, the position information associated with all image data specified for processing, while additionally causing the acquisition location presentation images to be displayed on a map image updated with corrected position information; and association results save processing that applies and saves the association of position information with respect to all image data specified for processing, the save processing being conducted according to save command input.

The program in accordance with an embodiment of the present invention as described above is realized by means of an application program for executing matching processing (i.e., a matching program). More specifically, such a program processes a single set or a plurality of sets of image data that have been specified for processing, wherein matching is conducted on the basis of time and date information with respect to log data, and wherein position information is subsequently associated to respective sets of image data.

An embodiment of the present invention may be configured such that acquisition location presentation images corresponding to respective sets of image data are displayed on a map image in accordance with the association results, thereby enabling the user to check the results of the association of position information to the image data.

Furthermore, if the user discovers inaccuracies while checking the above results on a map image, then the user may input a time value (or information corresponding to a time value) to correct the association of position information with respect to all image data specified for processing. The time value herein may be a time value corresponding to an inaccuracy in the internal clock of an image acquisition apparatus such as a digital camera, or a time value corresponding to a difference in time zones.

In addition, when the user inputs such a time value, processing may be executed to display acquisition location presentation images on a map display wherein the corrections in accordance with the input time value are reflected in the display.

According to an embodiment of the present invention, when processing is executed to associate position information to image data, and furthermore when appropriate association is not achieved due to factors such as time inaccuracies in the internal clock of the image acquisition apparatus or time zone differences, associated position information can be easily corrected for a large amount of image data with little effort and by means of a user interface that is visually easy to understand.

DESCRIPTION OF THE PREFERRED EMBODIMENTS

Hereinafter, embodiments of the present invention will be described. The application program 2a for executing matching processing (hereinafter referred to as a matching program) to be hereinafter described is given as an example of an embodiment of a program in accordance with the present invention. Similarly, the personal computer 1 onto which the matching program 2a is installed constitutes an image data processing apparatus in accordance with an embodiment of the present invention, while the matching processing executed by the personal computer 1 constitutes an image data processing method in accordance with an embodiment of the present invention.

Figure 1:
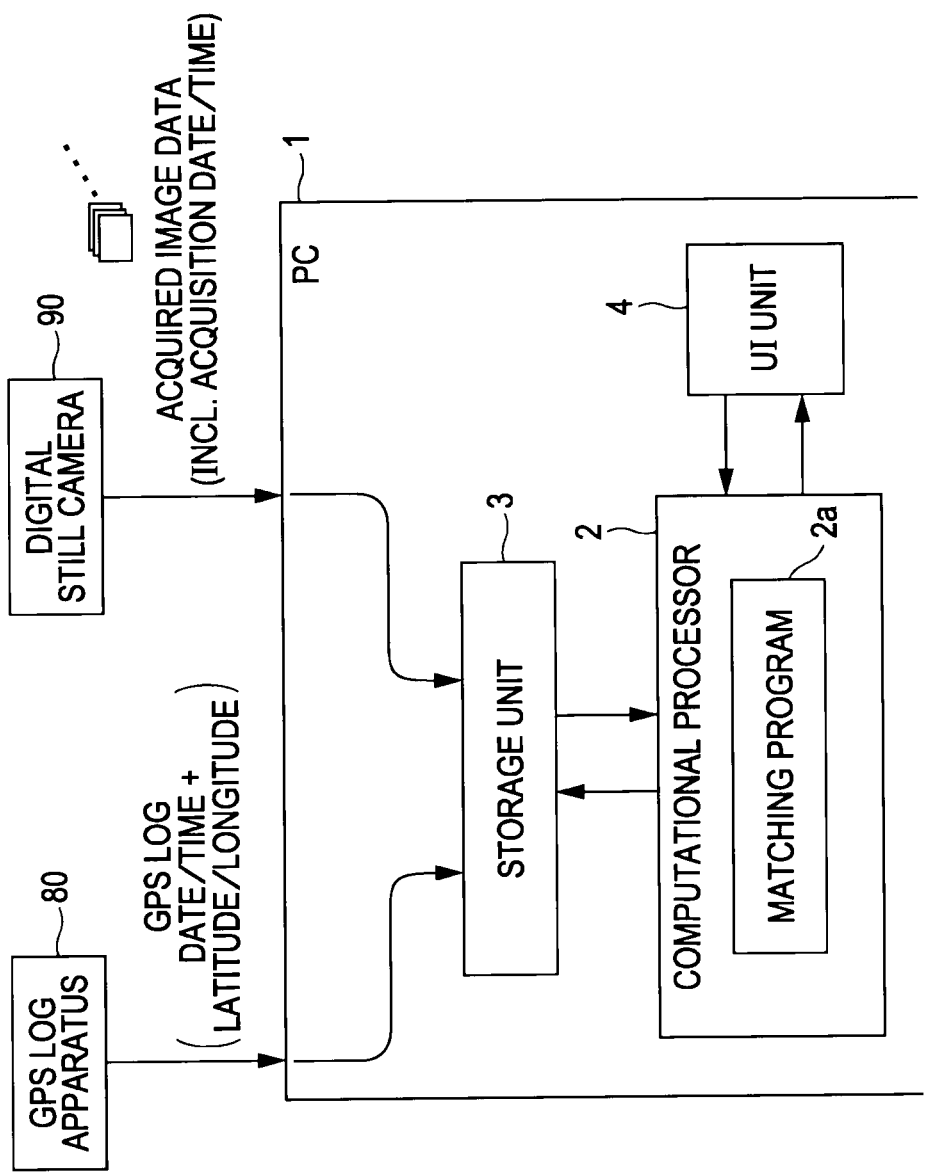
FIG. 1 is a diagram for explaining the general operation of an embodiment in accordance with the present invention.

FIG. 1 schematically illustrates the general operation of the present embodiment. FIG. 1 shows a digital still camera 90 and a GPS log apparatus 80. The digital still camera 90 is an ordinary still image acquisition device used by a typical user, wherein image acquisition is conducted according to user operations. Date and time information (i.e., values for the year, month, day, hour, minute, and second of image acquisition) obtained by an internal clock is then appended to respective sets of image data that have been acquired and saved.

The GPS log apparatus 80 is a compact device carried by the user, and is provided with functions to receive and store information with respect to a global positioning system (GPS). Herein, the GPS log apparatus 80 successively saves position information (i.e., latitude and longitude values) as well as date and time information. As a result of being carried by the user, the GPS log apparatus 80 creates a route trace of the user's movement that is stored as GPS log data. Herein, the GPS log data is accumulated data containing associated values for the present time and the present position acquired at, for example, predetermined time intervals (or alternatively, every time a change in the position information is detected).

Subsequently, the user transfers image data acquired by means of the digital still camera 90 to a personal computer 1, where the image data is saved to a storage unit 3 (such as, for example, the hard disk drive (HDD) 19 to be hereinafter described). GPS log data accumulated in the GPS log apparatus 80 is also imported to the personal computer 1 and stored in the storage unit 3.

In addition, installed on the personal computer 1 is a matching program 2a, which functions as software for taking the image data that was acquired by the digital still camera 90 and appending thereto position information that indicates the image acquisition location. By activating the matching program 2a, a computational processor 2 (i.e., the CPU 11 to be hereinafter described) performs computational processing operates in accordance with the matching program 2a.

The user interface 4 represents one or more user interface devices, including input apparatus such as a keyboard and mouse used by the user, as well as display apparatus for presenting display output to the user.

The processing executed by the computational processor 2 on the basis of the matching program 2a is as follows.

The computational processor 2 processes a single set or a plurality of sets of image data that have been selected as a result of a user operation, for example, from among the image data stored in the storage unit 3. Subsequently, and with respect to each set of image data specified for processing, the computational processor 2 conducts matching on the basis of date and time information with respect to the GPS log data, and then associates position information to each set of image data.

In addition, the computational processor 2 produces a display on the user interface 4 in accordance with the results of the above association processing. More specifically, the computational processor 2 causes a map image to be displayed, while additionally causing acquisition location presentation images corresponding to respective sets of image data to be displayed on the map image. In so doing, the user is able to check the results of the association of position information to the image data. By means of a such image display, the user is thus able to confirm whether or not the association of position information is correct.

If the user perceives a misalignment, then the user subsequently inputs a time value (or information corresponding to a time value) in order to correct the misalignment. In accordance with the input, the computational processor 2 then corrects the position information with respect to all image data that has been specified for processing. For example, in accordance with the correction information in form of a time value, the computational processor 2 may first correct the date and time information indicating the time of image acquisition that is appended to the image data for all image data specified for processing. Subsequently, the computational processor 2 may again conduct matching on the basis of date and time information using the GPS log data, and newly associated position information to respective sets of image data.

In addition, when correcting associations according to a time value input as described above, the computational processor 2 may also cause the user interface 4 to produce a display wherein the acquisition location presentation images are displaced on the map image in a manner reflecting the corrections being made.

If the user perceives that the acquisition location presentation images are correctly positioned on the map image, then the user may input a save command in order to apply the associations. Operating in accordance with the command input, the computational processor 2 then applies and saves the association of position information with respect to all image data specified for processing. More specifically, the computational processor 2 appends respectively associated position information (i.e., latitude and longitude values) to each image data file, and then causes the one or more image data files to be saved in the storage unit 3.

In the present embodiment, the processing summarized above is executed. Hereinafter, the configuration and operation of an embodiment of the present invention will be described in detail.

Figure 2:
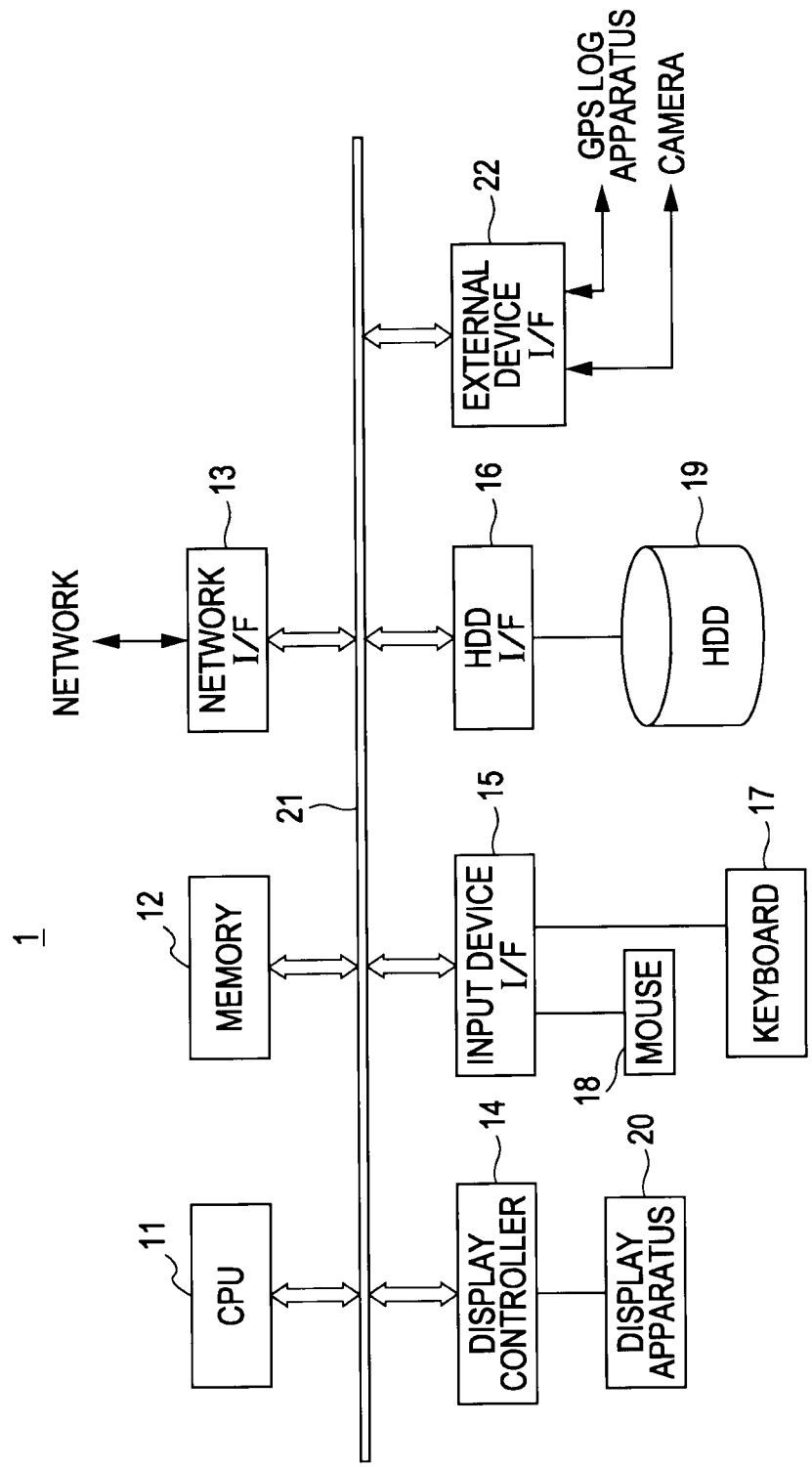
FIG. 2 is a block diagram of a personal computer in accordance with an embodiment of the present invention.

FIG. 2 illustrates an exemplary configuration of the personal computer 1 (hereinafter referred to as the PC 1). As shown in FIG. 1, the personal computer 1 includes various components, such as a central processing unit (CPU) 11, memory 12, a network interface 13, a display controller 14, an input device interface 15, an HDD interface 16, a keyboard 17, a mouse 18, an HDD 19, a display apparatus 20, a bus 21, and an external device interface 22.

The CPU 11 is the main controller of the PC 1, and executes a variety of control processing in accordance with programs stored in the memory 12. The CPU 11 and the other components of the PC 1 are mutually connected by means of the bus 21.

Each device on the bus 21 is respectively assigned a unique memory address or I/O address, thereby enabling device access by the CPU 11 using such addresses. The bus 21 may be, for example, a PCI (Peripheral Component Interconnect) bus.

The memory 12 herein refers to both volatile and non-volatile memories. The memory 12 may thus include non-volatile memory such as ROM (read-only memory) that is used to store one or more programs, and RAM (random access memory) or EEP-ROM (electrically erasable and programmable read-only memory) that is used as a computational work area and for temporary storage of various data. The memory 12 stores program code executed by the CPU 11, unique identification information, as well as other information, and is used as a buffer area for communications data and as a work area for working data currently being executed.

The network interface 13 connects the PC 1 to a network such as the Internet or a LAN (local area network) in accordance with a given communications protocol such as Ethernet®. Via the network interface 13, the CPU 11 is able to communicate with various devices connected to the network.

The display controller 14 is a specialized controller used to actually process draw commands issued by the CPU 11. The display controller 14 supports bitmap drawing functions corresponding to, for example, SVGA (Super Video Graphic Array) or XGA (extended Graphic Array). The draw data processed by the display controller 14 may, for example, be first temporarily written to a frame buffer (not shown in the drawings) and subsequently output on a screen by the display apparatus 20. The display apparatus 20 may be formed as an organic EL (Electroluminescence) display, a CRT (Cathode Ray Tube) display, or an LCD (Liquid Crystal Display), for example.

The input device interface 15 is an apparatus for connecting user input devices such as the keyboard 17 and the mouse 18 to a computer system such as the PC 1. More specifically, the user's operation input with respect to the PC 1 is made using the keyboard 17 and the mouse 18, and the operation input information is then supplied to the CPU 11 via the input device interface 15.

The HDD interface 16 conducts read/write interface processing with respect to the hard disk drive (HDD) 19. The HDD 19 is a common storage medium, being an external storage apparatus having a magnetic disk fixedly mounted therein. Compared to other external storage apparatus, the HDD 19 is superior with respect to features such as storage capacity and data transfer speed. Placing a software program on the HDD 19 in an executable state is herein referred to as installing the program on the system. Ordinarily, the HDD 19 stores information such as operating system program code executed by the CPU 11, application programs, and device drivers in a non-volatile manner. When launching an application program during boot-up of the PC 1 or in accordance with user-level operations, various programs stored in the HDD 19 are loaded into the memory 12. The CPU 11 then executes processing on the basis of the programs loaded into the memory 12.

The external device interface 22 is an interface for external devices connected to the PC 1 by means of the USB (Universal Serial Bus) standard, for example. In the present example, the digital still camera 90 and the GPS log apparatus 80 shown in FIG. 1 are supposed as the external devices. By communicating via the external device interface 22, the PC 1 is able to import image data from the digital still camera 90 and import GPS log data from the GPS log apparatus 80.

It should be appreciated that the external device interface 22 is not limited to the USB standard, and that other interface standards, such as IEEE 1394 (Institute of Electrical and Electronics Engineers 1394), may also be used.

In a PC 1 like that described above, various operations are executed as a result of the software structure in the CPU 11. In other words, various operations are executed as a result of the CPU 11 executing computational processing and control operations on the basis of software such as that of an application program, an OS (Operating System), and one or more device drivers.

In the present example, processing operations are conducted according to an application program referred to herein as the matching program 2a, as described with reference to FIG. 1. As a more specific example, the matching program 2a may be installed on the HDD 19, and then loaded into the memory 12 upon activation. Subsequently, the CPU 11 executes suitable computational processing and control processing on the basis of the matching program 2a loaded into the memory 12.

In addition, the HDD 19 is an example of the storage unit 3 shown in FIG. 1. Information such as image data imported from the digital still camera 90 and GPS log data imported from the GPS log apparatus 80 is stored in the HDD 19. The HDD 19 may also store a map database used in order to render maps. In addition, the input device interface 15, including the keyboard 17, the mouse 18, as well as the display controller 14 and the display apparatus 20, represent specific examples of the user interface 4 shown in FIG. 1.

The matching program 2a in accordance with the present embodiment may be recorded in advance onto a recording medium such as the HDD 19 that is built into a device such as the PC 1, or onto memory such as ROM or flash memory within a microprocessor provided in the CPU 11.

Alternatively, the matching program 2a may be temporarily or permanently stored (i.e., recorded) on a removable recording medium, such as a flexible disk, a CD-ROM (Compact Disc Read Only Memory), an MO (Magneto-Optical) disk, a DVD (Digital Versatile Disc), a Blu-ray disc, a magnetic disk, semiconductor memory, or a memory card. Such a removable recording medium may then be provided as packaged software.

In addition, in addition to being installed onto a personal computer or similar device from a removable recording medium, the program may also be downloaded from a download site via a network such as a LAN (Local Area Network) or the Internet.

Hereinafter, the matching processing that is conducted using image data and GPS log data imported from the digital still camera 90 and the GPS log apparatus 80 will be described. In other words, the processing to associate position information to respective image data will now be described.

Figure 3:
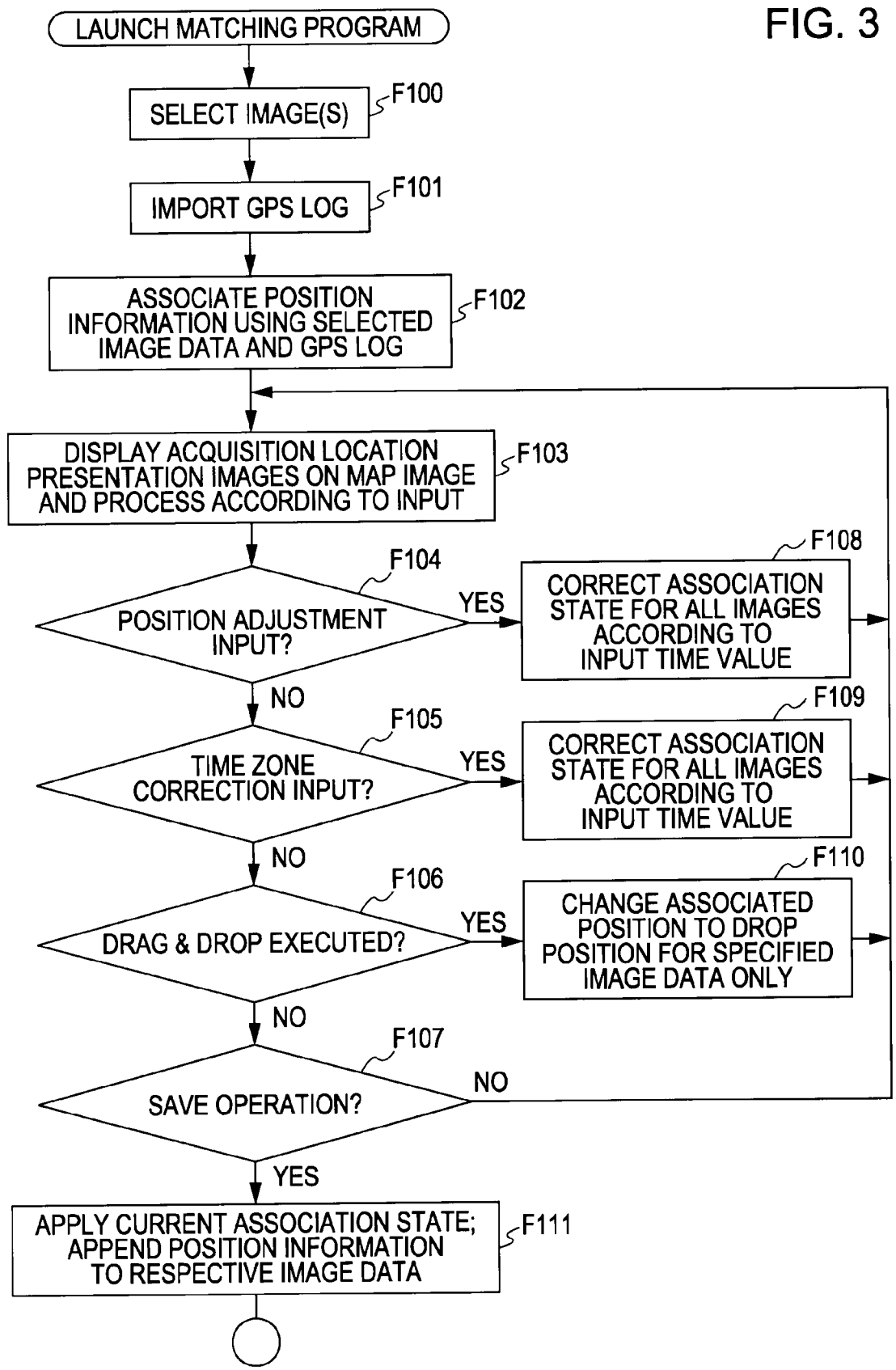
FIG. 3 is a flowchart of processing executed by a matching program in accordance with an embodiment of the present invention.

FIG. 3 illustrates processing that is executed by the CPU 11 on the basis of the matching program 2a. After the matching program 2a is launched, the CPU 11 first conducts processing in step F100 to select and read the image data to be processed.

For example, the CPU 11 may cause an initial screen of the matching program 2a to be displayed by the display apparatus 20, and subsequently prompt the user to select either a single image data file or a plurality of image data files to be processed. In other words, the user selects the one or more image data files to which the user wants to associate position information, the one or more image data files being selected from among image data files that have been imported from the digital still camera 90 and are currently stored on the HDD 19. Subsequently, in accordance with operation input from the user (i.e., an operation specifying one or more image data files), one or more selected image data files are read from the HDD 19 and then displayed by the display apparatus 20 in a list view using thumbnail images (i.e., reduced-size images), for example.

The above image data selection processing may also be configured to operate automatically such that, when image data is imported from the digital still camera 90 to the HDD 19, the newly-imported image data files are automatically selected.

In step F101, the CPU 11 reads suitable log data from among the GPS log data that has been imported to the HDD 19. More specifically, the CPU 11 may ascertain a suitable date/time range from the image acquisition date and time information appended to the one or more image data files that were selected in step F100, and then read GPS log data from the HDD 19 that corresponds to the date/time range. If no GPS log data is found to exist in the relevant date/time range, then the CPU 11 may return an error and cause the display apparatus 20 to display a message prompting the user to import log data from the GPS log apparatus 80.

Upon reading from the HDD 19 the one or more image data files specified for processing as well the GPS log data corresponding to a relevant date/time range, the CPU 11 executes matching processing in step F102. More specifically, the CPU 11 cross-checks respective image data files specified for processing with GPS log data on the basis of date and time information, and then associates position information (i.e., latitude and longitude values) with an image data file having identical date and time values (or alternatively, having the closest date and time values).

In the subsequent step F103, the CPU 11 causes one or more acquisition location presentation images corresponding to the respective one or more image data files to be displayed on a map image by the display apparatus 20. In addition, the CPU 11 executes suitable processing according to input operations made by the user with respect to the screen display.

Figure 4:
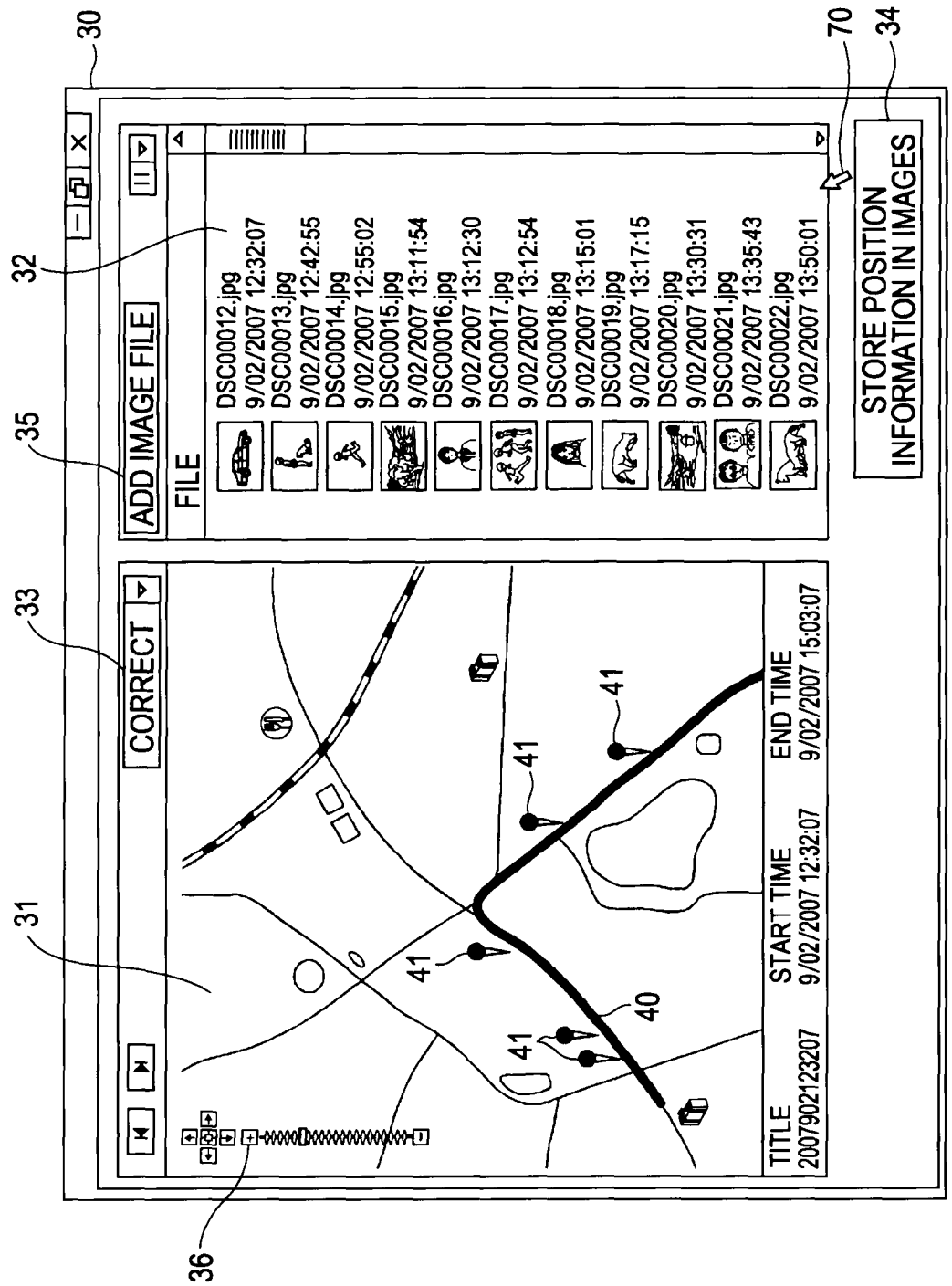
FIG. 4 is a diagram for explaining an exemplary screen display in accordance with an embodiment of the present invention.

An exemplary display image is illustrated in FIG. 4. The screen 30 is shown as a result of launching the matching program 2a, and primarily includes a map display portion 31 and a file display portion 32.

The file display portion 32 is an area that displays a list of the one or more image data files that were specified for processing in step F100. Displayed in the file display portion 32 are thumbnail images corresponding to respective image data files selected in step F100, as well as corresponding filenames (such as "DSC00012.JPG") and year, month, day, hour, minute, and second values corresponding to the date and time information that is appended to each image data file and indicates the time of image acquisition. The date and time information herein is information that is appended in the digital still camera 90 at the time of image acquisition.

In order to allow user operations when selecting one or more image data files in the above step F100, an "Add Image File" button is displayed. A file selection screen is displayed as a result of the user clicking the "Add Image File" button, whereby the user is able to select and add arbitrary image data files for processing.

In the above step F102, matching processing is executed with respect to the acquired image data specified for processing that is displayed in the file display portion 32. Subsequently, the results of the matching processing are shown in the map display portion 31 as a map image display. More specifically, the CPU 11 executes processing on the basis of the position information that is associated with respective image data files as a result of the matching processing, wherein a map image of a region or district containing the respective position information is displayed.

The map image is created as a result of rendering a map image of a suitable region using a map database stored in the HDD 19. It should be appreciated that the map database for map rendering is not limited to being stored on the HDD 19 (i.e., in the PC 1). For example, a suitable range of map image data may be displayed after being acquired from an external server (such as an Internet website, for example) by means of network communications via the network interface 13.

Displayed on the map image are pointers 41, herein functioning as the acquisition location presentation images. In addition, a route trace image 40 ascertained from the GPS log data is also displayed.

The route trace image 40 indicates a route tracing the user's movement on the map for the range acquired as GPS log data. For example, the route trace image 40 may display the user's movement range on the map by means of a specific color or display state.

A single pointer 41 is an acquisition location presentation image corresponding to a single image data file. In other words, the pointers 41 are displayed so as to indicate the acquisition locations of respective image data files on the map image according to the position information respectively associated with the image data files. In so doing, each of the plurality of pointers 41 shown in FIG. 4 indicates to the user the acquisition location of a particular image.

By means of a screen display like the above, the user is able to check the state of the association of position information with respect to particular image data. In addition, the user is also able to perform various operations for confirming or correcting associations. The CPU 11 then executes processing in step F103 in accordance with the above screen display and user operations.

The user operations performed with respect to the screen display may include operations performed with respect to the map image itself, image presentation operations, correction operations for adjusting positions, correction operations for inputting a time zone, drag and drop operations performed using the pointers 41, and operations to save position information with respect to one or more images.

The operations with respect to the map image itself may include operations for changing the map scale and scrolling or moving the displayed range. According to operations made by the user with respect to a map operation image 36, the CPU 11 controls render processing to change the scale or position of the displayed map image.

Image presentation operations refer to operations for causing thumbnail images to be displayed on the map image instead of (or alternatively, together with) the pointers 41. For example, the user may select one or more image data files for image presentation from among the image data files displayed in the list in the file display portion 32.

Figure 5:
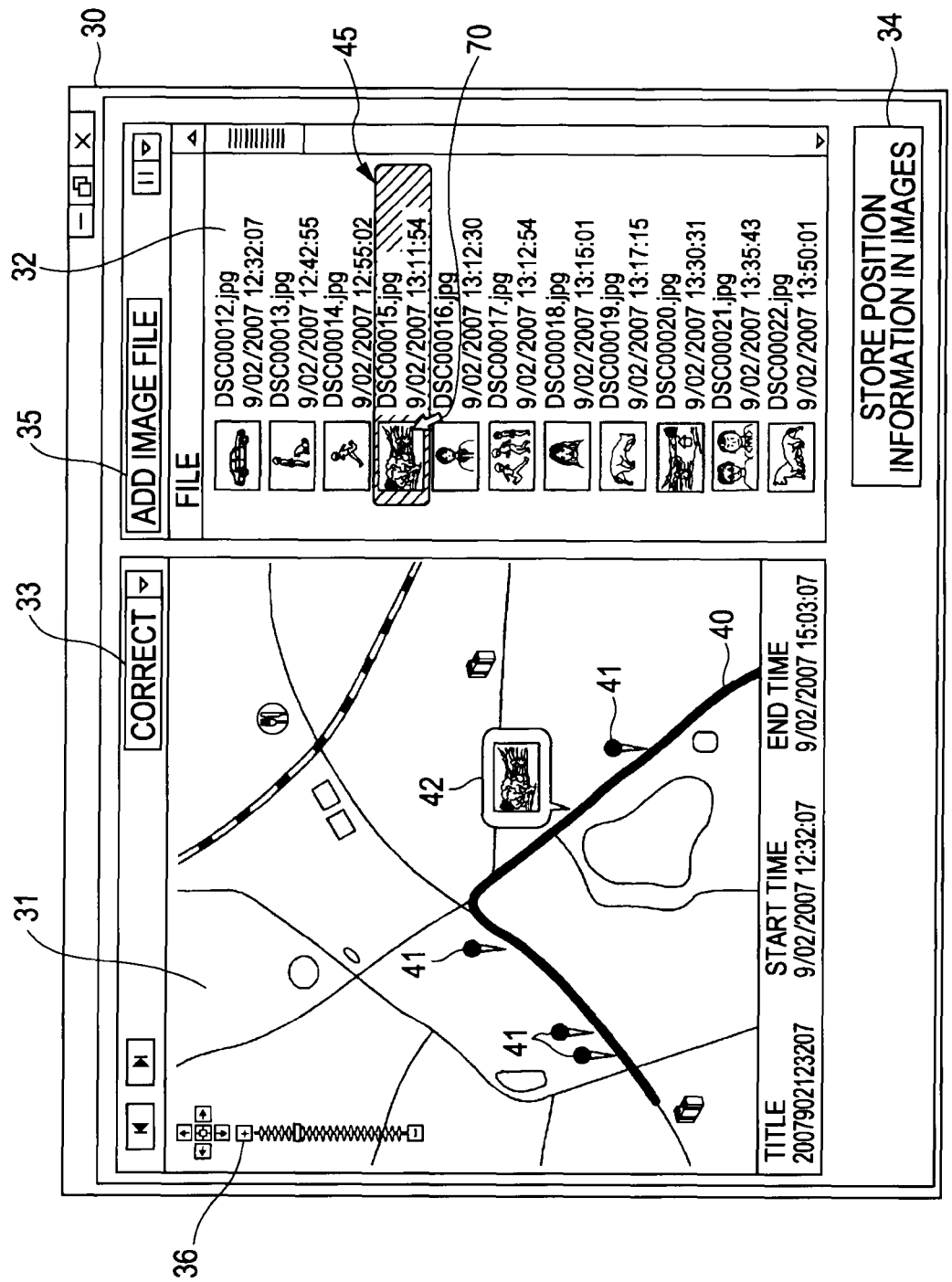
FIG. 5 is a diagram for explaining an exemplary display of thumbnail images on a map in accordance with an embodiment of the present invention.

FIG. 5 illustrates an example wherein the user has clicked (or alternatively, double-clicked) an image data file having the filename "DSC00015.JPG" in the file display portion 32, thereby resulting in the selected state 45. In this case, a thumbnail image 42 corresponding to the "DSC00015.JPG" image date file is displayed on the map image instead of a pointer 41.

More specifically, if the CPU 11 detects that the user has performed an operation selecting an image data file in the file display portion 32, then the CPU 11 conducts a control that causes a thumbnail image 42 to be displayed at the position of the pointer 41 for the selected image data file. In the case where the user specifies a plurality of image data files, the CPU 11 may cause respective thumbnail images 42 to be displayed in place of the pointers 41 on the map image.

By causing one or more thumbnail images 42 to be displayed on a map in this way, the user is able to directly check image acquisition locations and map positions for images that the user has acquired. Consequently, the user is able to more easily and accurately check the state of the association of position information with respect to image data on a map.

For example, given the image data file being displayed as a thumbnail image 42 in FIG. 5, and assuming that the user clearly remembers the location where the image was acquired, then by viewing the display shown in FIG. 5, the user is able to easily determine whether or not the position indicated on the map is correct.

Furthermore, in the case where an image was acquired containing distinctive or famous buildings or structures, such as an image acquired with Tokyo Tower or the Diet Building as the background, then the user is able to clearly recognize when the position of the image on the map, as indicated by a thumbnail image 42, differs from the position of the particular building or structure on the map.

In this way, pointers 41 and thumbnail images 42 are displayed in the map display portion 31. By means of such pointers 41, as well as thumbnail images 42 for one or more specified image data files, the user is able to determine whether or not the acquisition locations indicated on the map image are correct. More specifically, the user is able to determine, using the map image, whether or not the association of position information with respect to the individual image data files subjected to matching processing in step F102 was correctly conducted. If the association of position information was not correctly conducted, then the user is subsequently able to perform operations for correcting associations.

In order to allow the user to perform correction operations, a correction menu button 33 is displayed on the screen. From the correction menu button 33, "Position Correction" and "Time Zone Correction" are selectable options in a pull-down menu.

Figure 6:
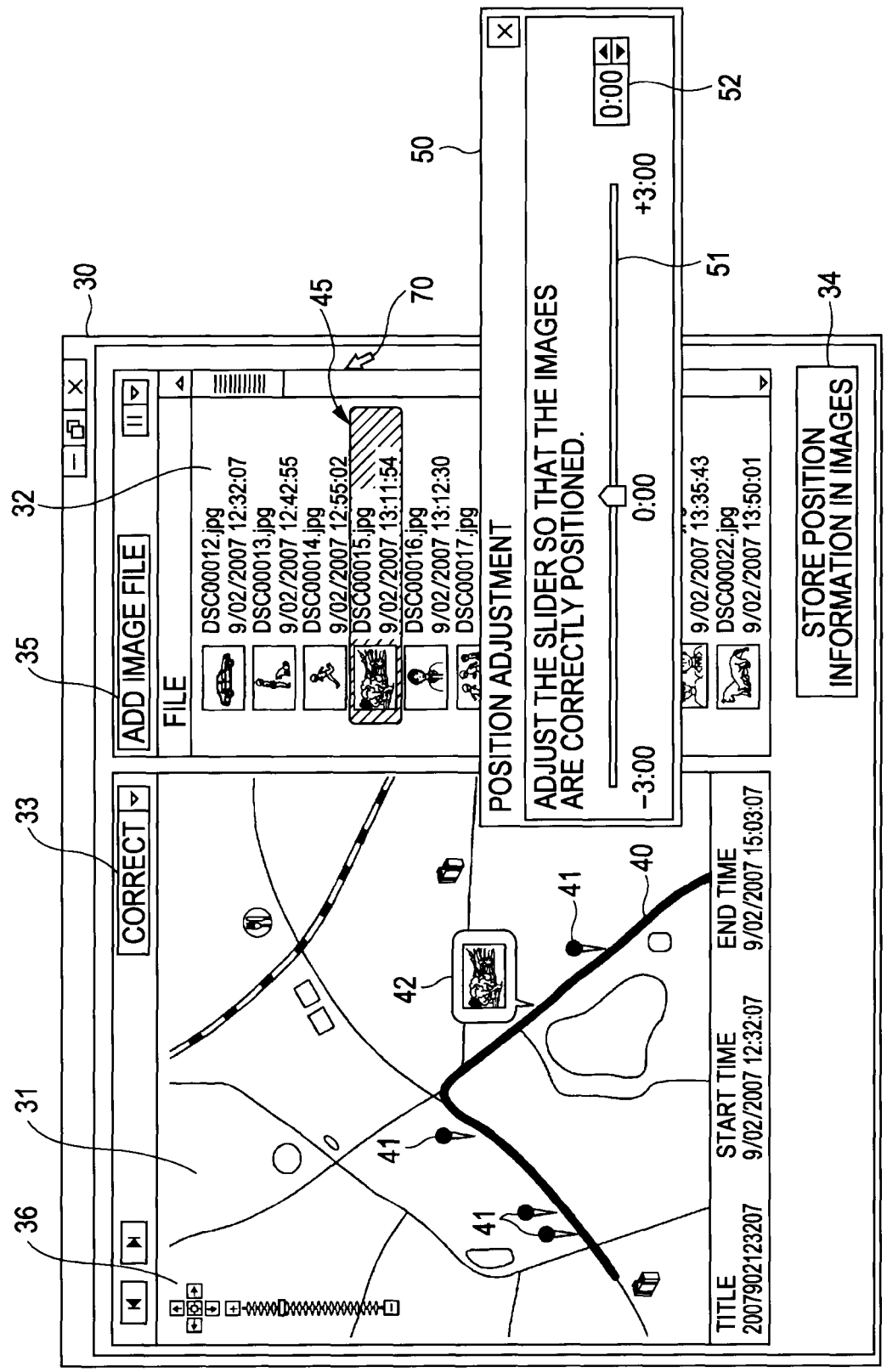
FIG. 6 is a diagram for explaining an exemplary display when conducting position adjustment in accordance with an embodiment of the present invention.

For example, given the display state shown in FIG. 5, if the user subsequently operates the correction menu button 33 to select "Position Correction", then the CPU 11 causes a slider 51 to be displayed in a position correction input dialog 50, as shown in FIG. 6. In addition, an adjustment time 52 corresponding to the slider 51 is also displayed.

The slider 51 is used to input a time offset correction value and has an adjustment range of +3 min to −3 min, for example. In addition, the time value shown by the adjustment time 52 can also be increased or decreased within the same range of +3 min to −3 min. It should be appreciated that the adjustment range of ±3 min herein is given merely by way of example.

By aligning a mouse cursor 70 displayed on the display apparatus 20 with the slider 51 and performing drag operations to the left or right using the mouse 18, the user is able to operate the slider 51 and input a time value for correcting positional misalignment.

Alternatively, the user may increase or decrease the time value displayed as the adjustment time 52 by means of mouse clicks or by direct numerical input using the keyboard 17, and thereby input a time value for correcting positional misalignment.

If the user performs position correction input while the position correction input dialog 50 is being displayed, then the process executed by the CPU 11 proceeds from step F104 to F108. Subsequently, in accordance with input time value, the CPU 11 corrects the association of position information with respect to all image data files specified for processing.

More specifically, the CPU 11 first corrects the appended date and time information that indicates the time of image acquisition for all image data files specified for processing. For example, if a time value of +1 min 23 sec is input, then the values in the date and time information indicating the time of image acquisition will be advanced by 1 min 23 sec for all image data files. Subsequently, matching is conducted again in the new state on the basis of date and time information using GPS log data. In so doing, position information is newly associated with respect to individual image data files. By subsequently proceeding to step F103 after executing the processing in step F108, a display is produced in accordance with the corrected associations.

Figure 7:
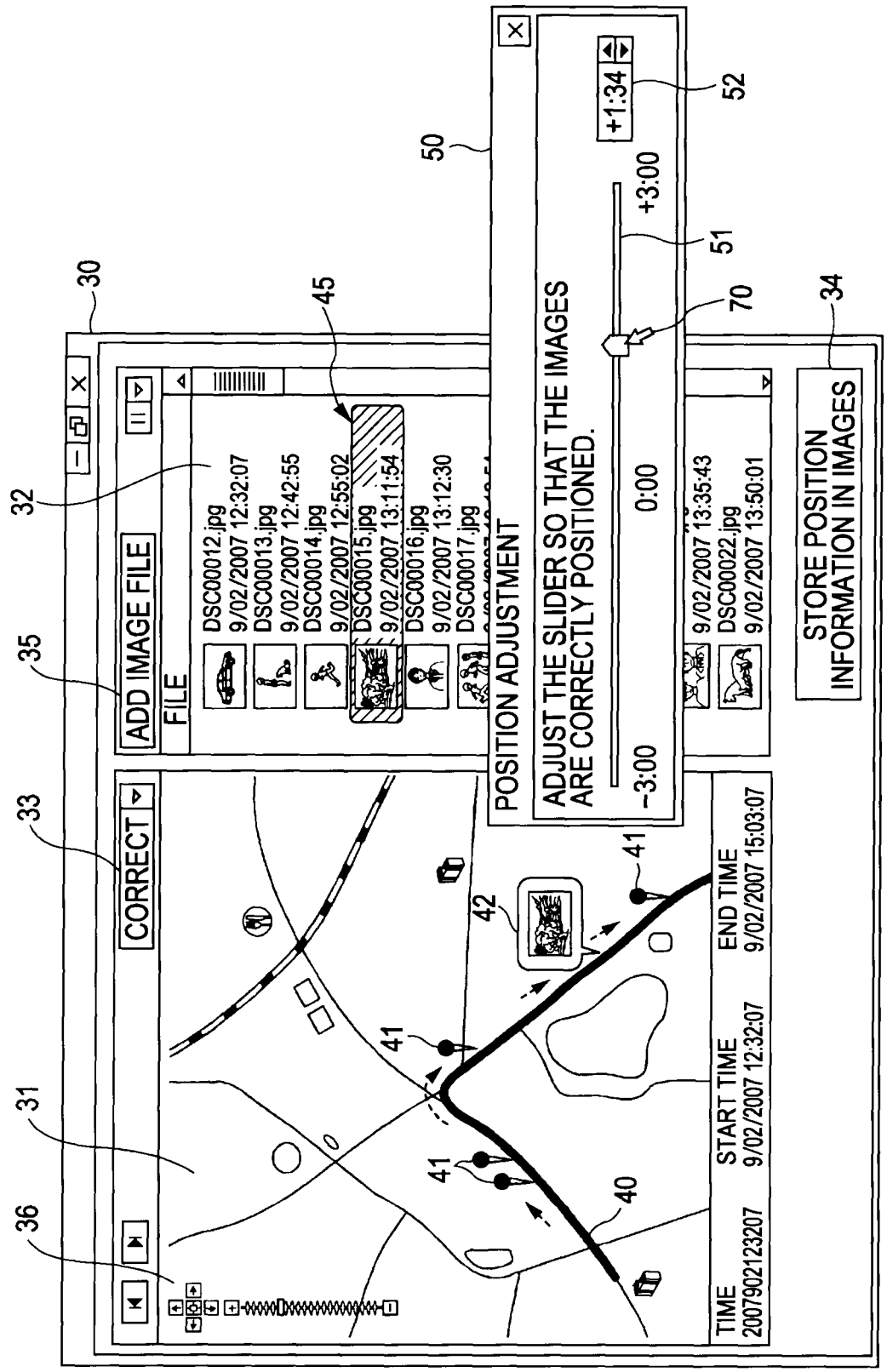
FIG. 7 is a diagram for explaining an exemplary display when conducting position adjustment in accordance with an embodiment of the present invention.

By executing such processing, a display like the following is produced. FIG. 7 illustrates a state wherein the user has operated the slider 51. By way of example, FIG. 7 shows the state wherein a time value of +1 min 34 sec has been input.

By executing processing in step F108 in accordance with the above time value input and then displaying the result in step F103, the pointers 41 and the thumbnail image 42 are displayed in their corrected positions on the map image. More particularly, by successively inputting time values by means of the slider 51 or the adjustment time 52, and additionally executing the processing from steps F108 to F103 with each successive input, a display is produced on the screen wherein all pointers 41 and the thumbnail image 42 move over the map as indicated by the arrows in FIG. 7.

In other words, a display is produced wherein the pointers 41 and the thumbnail image 42 move back and forth along the route trace image 40 on the map in accordance with the user's operation of the slider 51. Thus, the user makes suitable adjustments by operating the slider 51 while viewing the positions of the pointers 41 and the thumbnail image 42. In particular, when a thumbnail image 42 is being displayed, the user may operate the slider 51 such that the thumbnail image 42 is moved to the location where the corresponding image was acquired.

The time value input used for making position adjustments as described above corresponds to the case wherein, for example, the internal clock of the digital still camera 90 is slightly inaccurate with respect to the correct time. Consider the case wherein, for example, the internal clock of the digital still camera 90 is 2 min 31 sec faster with respect to the correct time in the GPS log data that is based on Greenwich Mean Time. In this case, the matching processing will result in the association of position information to image data that indicates the user's position 2 min 31 sec after the time when the user was actually in the location where the image data was acquired. Consequently, the pointers 41 (and the thumbnail image 42) are displayed at positions on the map display that are misaligned with the image acquisition locations.

In this case, the user operates the slider 51 such that the pointers 41 (and the thumbnail image 42) are moved to the correct image acquisition positions (i.e., positions recognized by the user as being mostly correct with respect to the locations where the user himself or herself acquired the images). In so doing, the inaccuracy in the date and time information appended to respective image data files that is due to the internal clock of the digital still camera 90 is corrected, and as a result, the association of position information is corrected.

Thus, the above operation of the slider 51 by the user is herein equivalent to correcting the state of the association of position information.

However, fine adjustments on the order of ±3 min like those described above are unsuited to the case wherein position information is incorrectly associated due to time zone differences. Consequently, if there exists misalignment on the map display that seems to be due to time zone differences, then the user may operate the correction menu button 33 and select "Time Zone Correction" from the pull-down menu.

Figure 8:
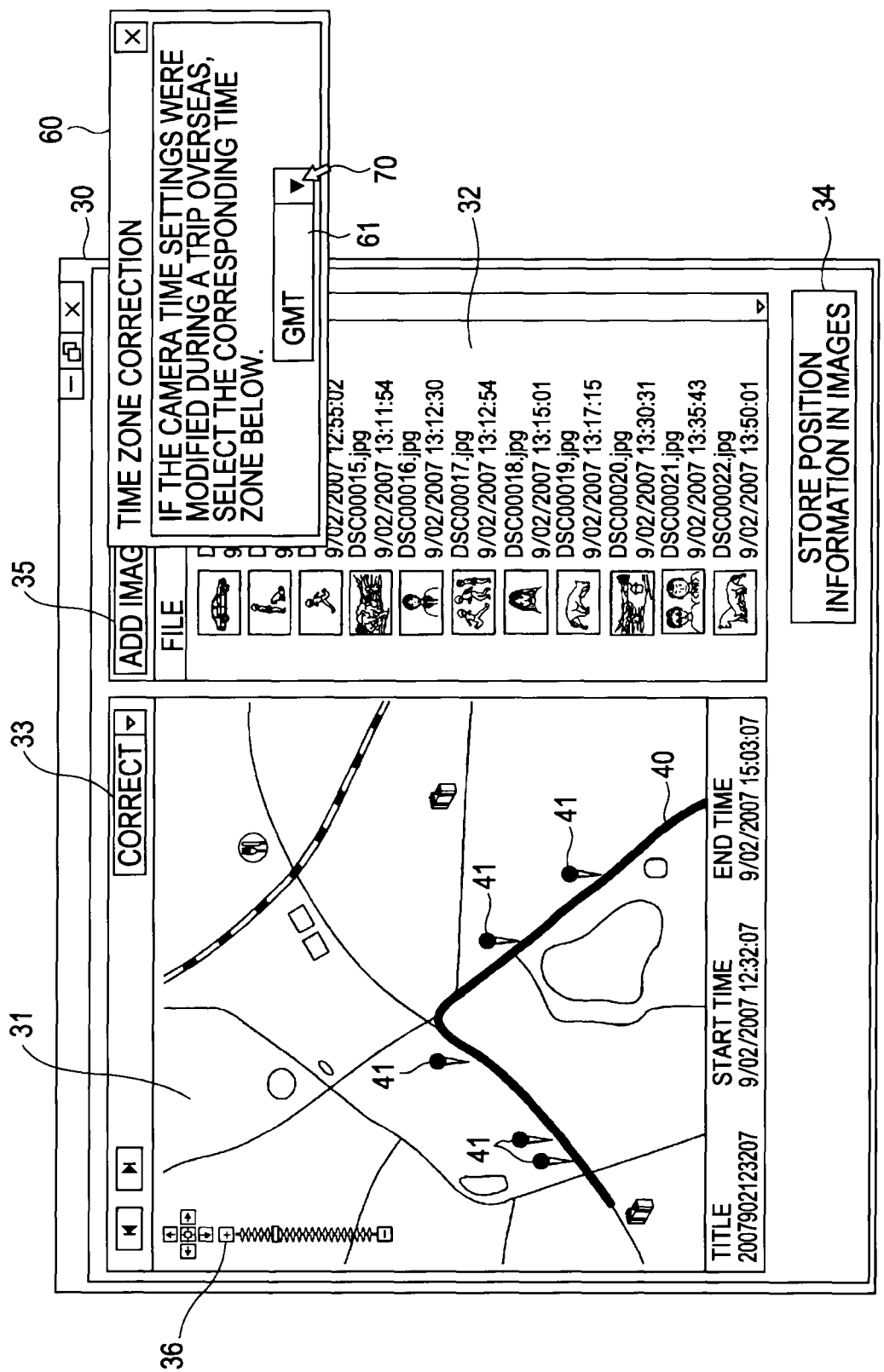
FIG. 8 is a diagram for explaining an exemplary display when conducting time zone adjustment in accordance with an embodiment of the present invention.

When "Time Zone Correction" is selected, the CPU 11 displays a time zone correction input dialog 60, as shown in FIG. 8. In the time zone correction input dialog 60, a time zone input portion 61 is displayed.

Figure 9:
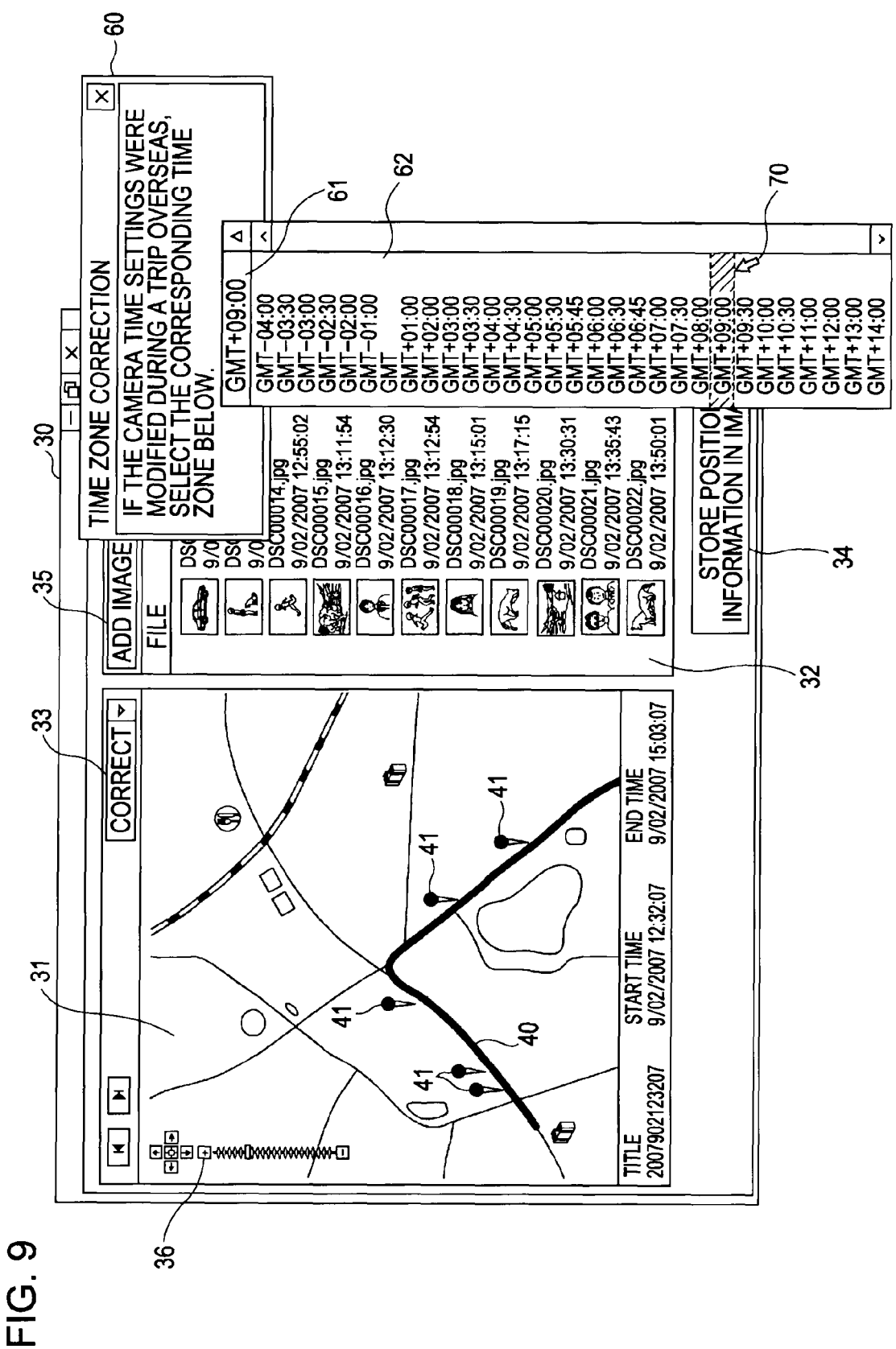
FIG. 9 is a diagram for explaining an exemplary display when conducting time zone adjustment in accordance with an embodiment of the present invention.

The time zone input portion 61 functions as a pull-down menu enabling the selection of time zone values, as shown in FIG. 9. For example, if "GMT +09:00" is selected from the pull-down menu as shown in FIG. 9, then the input time value indicates that the time is to be advanced 9 hours.

In the case where user causes the association of position information to be executed by means of the matching program 2a with respect to image data files that were acquired at an overseas travel destination, for example, then the user inputs the local time zone of the overseas travel destination into the time zone input portion 61.

When the user inputs a time value in the form of a time zone as described above, the process executed by the CPU 11 proceeds from step F105 to F109. Subsequently, in accordance with the input time value, the CPU 11 corrects the association of position information with respect to all image data files specified for processing.

More specifically, the CPU 11 first corrects the appended date and time information that indicates the time of image acquisition for all image data files specified for processing. It should be appreciated that instead of actually overwriting the acquisition date and time information recorded in the image data files, the CPU 11 may simply correct the time value of the time zone input (such as the +9 hr value shown in FIG. 9) in date and time information that has been read out for use in the matching processing. Alternatively, the CPU 11 may correct the time value that is temporarily input as the time zone with respect to the date and time information in the GPS log data rather than the date and time information in respective image data files.

Subsequently, matching is conducted again in the new state on the basis of date and time information with respect to the GPS log data and the image data files. In so doing, position information is associated with respect to individual image data files with the new time zone taken into account. By subsequently proceeding to step F103 after executing the processing in step F109, a display is produced in accordance with the corrected associations.

Figure 10:
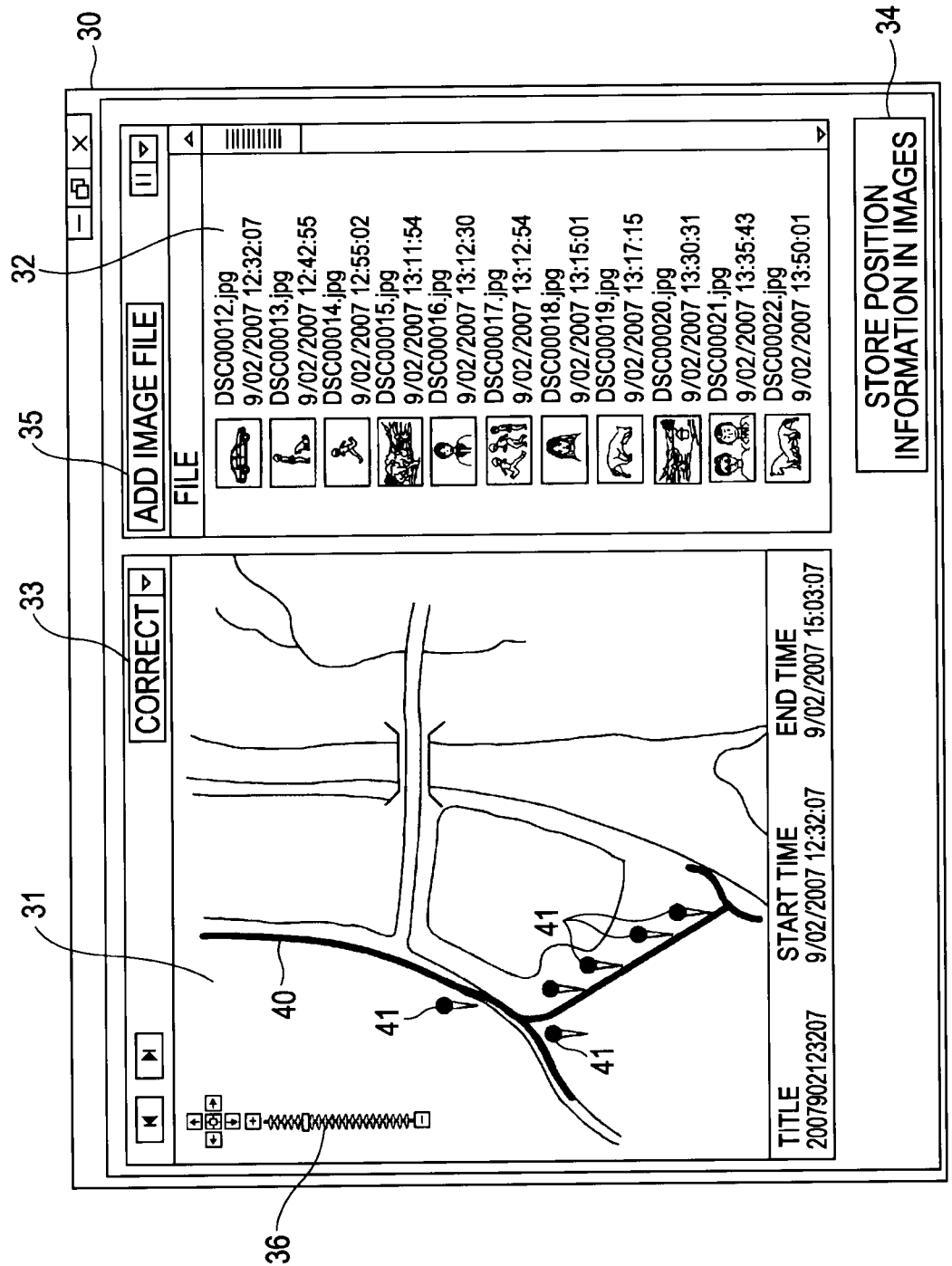
FIG. 10 is a diagram for explaining an exemplary display when conducting time zone adjustment in accordance with an embodiment of the present invention.

As a result of such processing, a display like that shown in FIG. 9 switches to a display like that shown in FIG. 10. For example, consider the state shown in FIG. 8, wherein a nine hour time difference has not been corrected. In this state, it is probably that the pointers 41 will be displayed on the map of a region that is entirely different from the place where the user actually acquired the images specified for processing. However, by correcting the time zone, associating position information, and then displaying a map on the basis of the range of the associated position information, a map image like that shown by way of example in FIG. 10 is displayed, being a map image for the place where the user actually acquired the images specified for processing. In the above map image, the acquisition locations for respective image data files are correctly indicated by the pointers 41 (or by one or more thumbnail images 42), while the extent of the user's movement is also displayed as a route trace image 40.

Even after conducting time zone correction as described above, there may still exist misalignment in the display positions of the pointers 41 due to inaccuracies in the internal clock of the digital still camera 90. In such cases, the user may enter correction input by selecting "Position Correction" from the correction menu button 33 and subsequently operating the slider 51.

By means of the position adjustment and time zone adjustment described above, the association of position information to respective image data files is corrected in a batch manner for all image data files specified for processing, and according to simple operations performed by the user.

However, due to factors such as limitations in the precision of the GPS position information acquired by the GPS log apparatus 80, there may occur cases wherein, when viewed individually, the displayed position of a single pointer 41 (i.e., a single image data file) is somewhat displaced from the actual image acquisition location.

Figure 11:
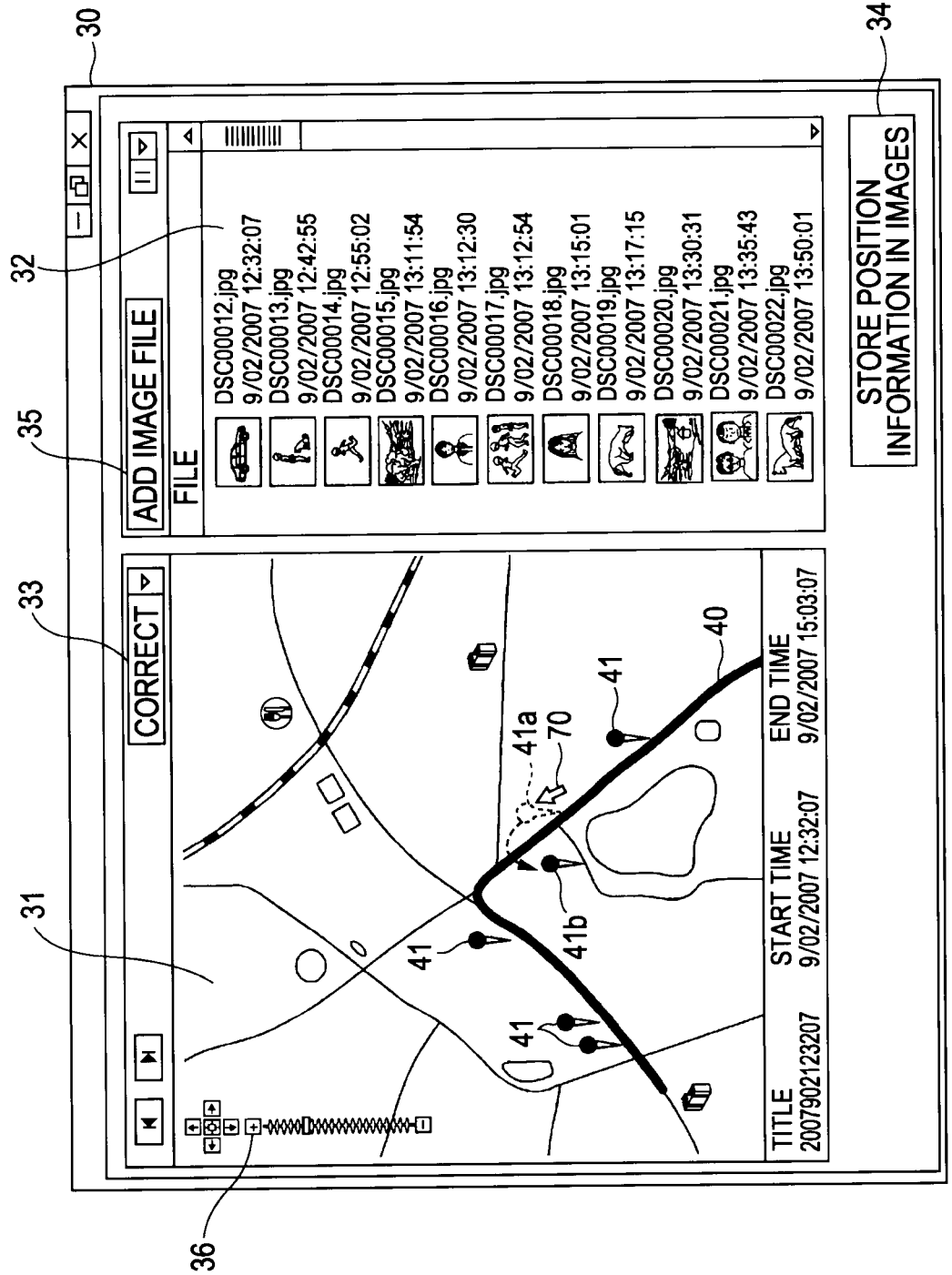
FIG. 11 is a diagram for explaining an exemplary display when conducting drag and drop operations in accordance with an embodiment of the present invention.
Figure 12:
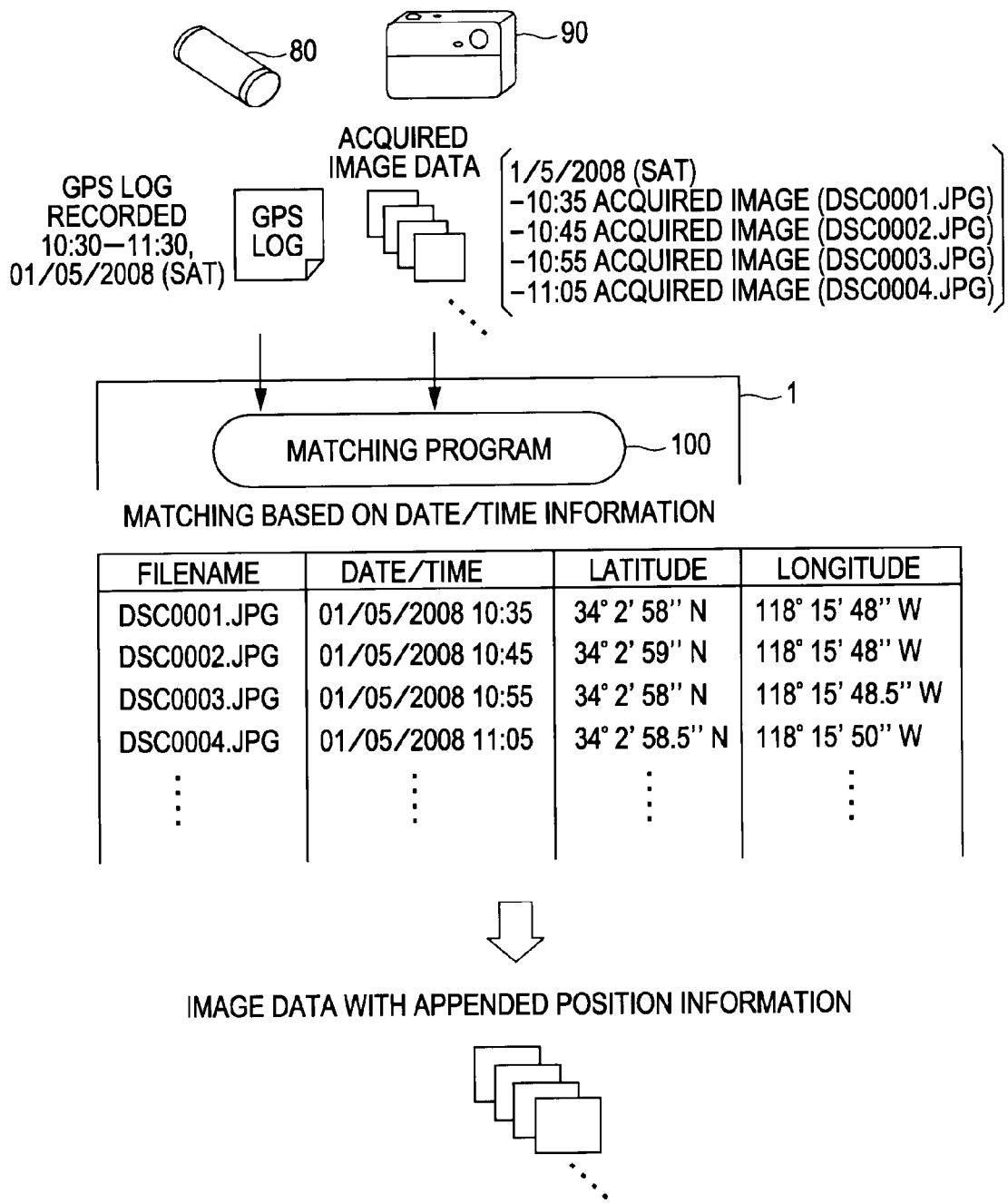
FIG. 12 is a diagram for explaining the association of position information with image data.

Consequently, it is desirable to allow the user to individually adjust the position of a pointer 41 (or a thumbnail image 42) on the map. For example, as shown in FIG. 11, the user may align the mouse cursor 70 with a particular pointer 41*a* and then move the pointer to the position indicated by the pointer 42*b* using a drag and drop operation. Obviously, in the case where a thumbnail image 42 is being displayed instead of a pointer 41, the user may be allowed to perform a drag and drop operation with respect to the thumbnail image 42.

Once the user has performed a drag and drop operation as described above, the process executed by the CPU 11 proceeds from step F106 to F110 and corrects the associated position information with respect to the single image data file indicated by the pointer 41 (or thumbnail image 42) that was subjected to the drag and drop operation. In this case, instead of executing matching processing again, the CPU 11 may simply replace the latitude and longitude values in the position information associated with the relevant image data file with the latitude and longitude values for the drop position on the map. By enabling the user to individually make fine corrections to the position information, a more accurate state of association of position information is achieved.

If the user determines that the positions of the pointers 41 (or one or more thumbnail images 42) shown in the map display portion 31 are correct, then the user subsequently performs a save operation by clicking the save button 34. Upon detecting the save operation, the process executed by the CPU 11 proceeds from step F107 to F111 and at that point applies the state of association of position information with respect to respective image data files and subsequently executes save processing. More specifically, the CPU 11 appends the respectively associated position information to each image data file (being Exif format files, for example) specified for processing, and then stores the image data files in the HDD 19. In so doing, the processing for associating position information to respective image data files by means of the matching program 2*a* is terminated.

According to the present embodiment as described above, the state of the matching processing is first presented on a map image. In other words, the associated positions indicating the acquisition locations of respective image data files are displayed on a map as the pointers 41. Furthermore, one or more thumbnail image 42 may also be displayed instead of the pointers 41. By means of such a display, the user is easily able to visually confirm whether or not position information is correctly associated with respective image data files.

In the case where the user detects a misalignment of positions on the above display, it is conceivable that such misalignment is due to a time inaccuracy in the internal clock of the digital still camera 90. If so, the user is able to easily perform correction operations for position correction. In other words, while checking the pointers 41 (or one or more thumbnail images 42) on the map image, the user may also operate the slider 51 (i.e., perform operations that correspond to inputting a time value) so as to correctly align the positions of the pointers 41.

Matching is then re-performed in accordance with the above slider operations, and the association of position information is corrected with respect to all image data files specified for processing. Thus, rather than correcting the position of each individual image data file (i.e., each pointer 41), the user is able to make corrections conveniently and in an easily understandable, visual manner.

Similarly, in the case where inappropriate associations are made due to time zone differences, the user may simply input a time value representing a particular time zone. Matching is then re-performed in accordance with the user's time zone input, and the association of position information is corrected with respect to all image data files specified for processing, without the user correcting the position of each individual image data file (i.e., each pointer 41).

In cases where such batch correction is unsuitable, such as when the associated position information for individual image data files is inaccurate due to factors such as GPS precision, it is possible to make corrections to more accurately associate position information by performing individual drag and drop operations.

It should be appreciated that the present invention is not limited to the foregoing embodiment, and that various modifications are also possible. The user interface used to input correction input may be arbitrarily configured, so long as the user is thereby able to supply input corresponding to a time value indicating a time offset or a time zone difference. For example, instead of using a slider 51 like that shown in FIGS. 6 and 7, the user interface may be configured such that the user directly inputs a time value, or adjusts the time forward or back by means of an image in the shape of a clock.

In addition, instead of using an image such as the position correction input dialog 50, an operation input method wherein the user moves the pointers 41 directly on the map image is also conceivable. For example, the pointers 41 and/or thumbnail images 42 may be moved along the route trace image 40 by pointing the mouse cursor 70 at a single pointer 41 or thumbnail image 42 and dragging. At this point, the other pointers then also move in conjunction with the drag operation. In so doing, positional misalignment can be corrected by batch.

However, in this case, since the amount of movement on the screen is different for each pointer, the computational load on the CPU 11 is increased as compared to the case wherein a time value is input using the slider 51 or similar means.

Obviously, the user's route trace that is recorded as GPS log data does not represent a constant movement distance per unit time. For this reason, the operation input method described above also involves computation for estimating the time that corresponds to how far the pointer 41 was dragged, wherein the distance on the map that is indicated by the dragged pointer 41 is cross-checked with log data within a given time range. Subsequently, on the basis of the estimated time difference, position information is newly associated with the other pointers 41 (i.e., the other image data files).

In addition to the pull-down menu format described above, the user interface may be configured such that the time zone input can be supplied as a result of the user directly inputting a time value or inputting a time zone value using a slider or similar format.

In addition, the user interface may be configured such that the user input a country name or region name. The CPU 11 then determines the value of the time difference according to the input country name or region name. If country names or region names are used in this way, the user can supply input relatively easily, even if the user has forgotten the relevant time zone.

In addition, an input method is also conceivable wherein a world map is displayed on screen, and a time zone is input as a result of the user specifying the country or region corresponding to the image acquisition location.

Furthermore, although the position correction dialog and the time zone correction dialog were taken to be separate dialogs in the foregoing embodiment, it should be appreciated that the respective time values therefor may also be input in a common dialog.

The matching program 2*a* in accordance with the present embodiment was described as being executed on a personal computer 1, but obviously the device made to function by a program in accordance with the present invention is not limited to a personal computer, and instead encompasses a variety of information processing devices, such as PDAs (Personal Digital Assistants), mobile telephones, videogame devices, video playback and recording devices, and various other devices. Consequently, an image data processing apparatus and image data processing method in accordance with an embodiment of the present invention may be realized by means of the various devices above and their operation.

In addition, in the present embodiment, the image data files were described as being still image data acquired by a digital still camera 90. However, it should be appreciated that the present invention may also be applied to video data acquired by a video camera.

In the case of video data, it is conceivable to associate position information using, for example, the date and time when acquisition was commenced (i.e., the date and time of the first frame, for example). Other features, however, such as the presentation of such associations on a map image and correction processing executed according to operation input, may be conducted as described in the foregoing embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. A non-transitory computer-readable storage medium including computer executable instructions, where the instructions, when executed, cause a computational processing apparatus to execute:

matching processing, being executed with respect to image data having appended thereto date and time information indicating a time of image acquisition, wherein all image data specified for processing is matched based on the date and time information using log data containing date and time information that is associated with position information, and wherein the position information is then associated with the image data specified for processing;

display processing that displays, on a map image, acquisition location presentation images that indicate acquisition locations of the image data specified for processing, the display processing being conducted based on the position information associated with the image data specified for processing;

correction processing that corrects, according to correction input including a time value, the associated position information for the image data specified for processing, while simultaneously causing the acquisition location presentation images to be displayed on a map image updated with the corrected position information, such that all of the acquisition location presentation images are moved on the map image in response to the correction input, which includes the time value, the correction input including the time value being input for adjusting the appended date and time information indicating the time of image acquisition; and association results save processing that applies and saves the association of the position information with respect to the image data specified for processing, the association results save processing being conducted according to save command input.

2. The storage medium according to claim 1, wherein the correction of position information in the correction processing includes first correcting appended image acquisition date and time information for all image data specified for processing, the correction being conducted according to correction input including the time value, conducting matching based on date and time information using the log data, and newly associating position information to the image data to thereby correct the associated position information with respect to all image data specified for processing.

3. The storage medium according to claim 1, wherein the correction input including the time value is input for issuing instructions to correct a time zone.

4. The storage medium according to claim 1, wherein thumbnail images of the image data are used as the acquisition location presentation images.

5. The storage medium according to claim 1, wherein the display processing also includes displaying, on a map image, a route trace image based on the log data.

6. The storage medium according to claim 1, where the instructions further cause the computational processing apparatus to execute:

correction processing that, in accordance with operation input that specifies and moves a particular acquisition location presentation image on the map image, corrects the position information associated with the image data that corresponds to a particular acquisition location presentation image.

7. The storage medium according to claim 1, wherein the correction input including the time value for the correction processing includes allowing a user to input the correction input via a slider such that the acquisition location presentation images are displayed as moving along a route trace image according to movement of the slider.

8. The storage medium according to claim 1, wherein, the instructions, when executed, further cause the computational processing apparatus to execute initial prompt processing that displays a prompt whereby a user selects either a single image data file or a plurality of image data files to be processed in the matching processing.

9. An image data processing method, comprising the steps of:

executing matching processing with respect to image data having appended thereto date and time information indicating a time of image acquisition, wherein all image data specified for processing is matched based on the date and time information using log data containing date and time information that is associated with position information, and wherein the position information is then associated with the image data specified for processing;

executing display processing that displays, on a map image, acquisition location presentation images that indicate acquisition locations of the image data specified for processing, the display processing being conducted based on the position information associated with the image data specified for processing;

executing correction processing that corrects, according to correction input including a time value, the position information associated with image data specified for processing, while simultaneously causing the acquisition location presentation images to be displayed on a map image updated with corrected position information, such that all of the acquisition location presentation images are moved on the map image in response to the correction input, which includes the time value, the correction input including the time value being input for adjusting the appended date and time information indicating the time of image acquisition; and executing association results save processing that applies and saves the association of the position information with respect to the image data specified for processing, the association results save processing being conducted according to save command input.

10. The image data processing method according to claim 9, further comprising the step of executing initial prompt processing that displays a prompt whereby a user selects either a single image data file or a plurality of image data files to be processed in the matching processing.

11. An image data processing apparatus, comprising:
 a storage unit configured to store both image data having appended thereto date and time information indicating the time of image acquisition, as well as log data containing date and time information that is associated with position information; and
 a computational processor;
 wherein the computational processor reads from the storage unit both image data specified for processing as well as the log data, and subsequently executes
  matching processing that conducts matching based on the date and time information and associates position information with respect to the image data specified for processing,
  display processing that displays, on a map image, acquisition location presentation images that indicate acquisition locations of the image data, the display processing being conducted based on the position information associated with the image data specified for processing,
  correction processing that corrects, according to correction input including a time value, the position information associated with all image data specified for processing, while simultaneously causing the acquisition location presentation images to be displayed on a map image updated with corrected position information, such that all of the acquisition location presentation images are moved on the map image in response to the correction input, which includes the time value, the correction input including the time value being input for adjusting the appended date and time information indicating the time of image acquisition, and
  association results save processing that applies and saves the association of the position information with respect to the image data specified for processing, the association results save processing being conducted according to save command input.

12. The image data processing apparatus according to claim 11, wherein, the computational processor further executes initial prompt processing that displays a prompt whereby a user selects either a single image data file or a plurality of image data files to be processed in the matching processing.

* * * * *